Apr. 24, 1923. 1,453,074
G. G. LAUREYNS
SAFETY APPLIANCE FOR ELEVATOR CAR GATES AND ELEVATOR SHAFT DOORS
Original Filed Nov. 9, 1920  6 Sheets-Sheet 1

Fig.1.

WITNESSES
INVENTOR:
GUSTAVE G. LAUREYNS,
BY
Charles C. Gill,
ATTORNEY.

Apr. 24, 1923. 1,453,074

G. G. LAUREYNS

SAFETY APPLIANCE FOR ELEVATOR CAR GATES AND ELEVATOR SHAFT DOORS

Original Filed Nov. 9, 1920  6 Sheets-Sheet 2

WITNESSES

INVENTOR:
GUSTAVE G. LAUREYNS,
BY
Charles C. Gill
ATTORNEY.

Patented Apr. 24, 1923.

1,453,074

UNITED STATES PATENT OFFICE.

GUSTAVE G. LAUREYNS, OF NEWARK, NEW JERSEY.

SAFETY APPLIANCE FOR ELEVATOR-CAR GATES AND ELEVATOR-SHAFT DOORS.

Application filed November 9, 1920, Serial No. 422,764. Renewed December 8, 1922.

*To all whom it may concern:*

Be it known that I, GUSTAVE G. LAUREYNS, a citizen of the United States, and a resident of Newark, in the county of Essex and State of New Jersey, have invented certain new and useful Improvements in Safety Appliances for Elevator-Car Gates and Elevator-Shaft Doors, of which the following is a specification.

The invention pertains to safety appliances for controlling the operation of elevator-car gates and elevator shaft doors, and it consists in the novel features, arrangements and combinations of parts hereinafter described, and particularly pointed out in the claims.

I accomplish several objects with the use of my invention, and the main purpose of the invention is to provide means whereby accidents to passengers entering and leaving or attempting to enter and leave elevator cars may be avoided.

In accordance with my invention the elevator shaft doors are operable by the elevator car gate, the devices for opening and closing the shaft doors from the car gate and for locking said doors in closed position being located at the shaft side thereof. I provide novel means for opening and closing the elevator car gate, and these means are under the control of the operator or attendant on the car and are to be actuated only after the car has come to rest at a floor of a building at which passengers are to leave or enter the car. The opening of the car gate results in the opening of the shaft door or doors, and likewise the closing of the car gate effects the closing of the shaft door or doors, said door or doors being automatically locked on reaching the closed position thereof.

One purpose of my invention is not only to afford safety, but to provide mechanism for operating the car gate and therefrom the shaft door or doors which is of very simple and easily installed character. By preference the car gate is moved to its open and closed positions by means operable from the usual lighting circuit on a car, and in carrying out this portion of my invention I provide a motor and a magnetic actuator from which the gate mechanism is set in motion and which, in the event of a passenger being caught between a closing gate or door and the jamb therefor, will yield to the resistance offered by the body of the passenger and thereby the passenger will be saved from such injury as might occur if the gate or door were forced to closed position by unyielding means or means which would not permit a slippage in the driving mechanism, should the gate or door while closing move against a passenger.

My invention presents several novel features and cooperative combinations of parts, as well as a number of advantages, all of which will be fully understood from the detailed description hereinafter presented, reference being had to the accompanying drawings, in which:

Fig. 6 is a corresponding section of the same illustrating some of the parts of the mechanism as moved to an operative position; Fig. 6 also illustrating in top view, partly broken away, an arm projecting from the back of the shaft door in position to be engaged by the mechanism shown as projected outwardly in Fig. 6;

Fig. 8 is a view corresponding with Fig.

4 but omitting some of the parts of the mechanism carried on the car gate for purposes of clearer illustration;

Fig. 14 is a horizontal section, partly broken away, through a portion of the car, building and shaft doors, taken on the dotted line 14—14 of Fig. 20 and illustrating the car gate and shaft door operating mechanism illustrated in Figs. 1 to 13 inclusive, while Fig. 20 illustrates a modification of the parts projecting outwardly from the car gate and inwardly from the shaft door;

Fig. 15 is a side elevation of the motor and its connections and gearing employed for actuating the car gate operating chain;

Fig. 16 is a detached front elevation, partly broken away, of the car gate and a modified form of mechanism secured thereon for cooperation with the projecting arm carried on the back face of the shaft door;

Fig. 17 is a horizontal section of the same, taken on the dotted line 17—17 of Fig. 16;

Fig. 18 is a detached view illustrating a modification in the car gate operating mechanism, the actuating chain shown in Fig. 18 being arranged for manual operation instead of by means of the electric motor shown in Figs. 15 and 21;

In the drawings, 25 designates a portion of a building, 26 an elevator shaft or well formed therein, 27 one of the floors of the building, 28 a doorway leading from said floor to said shaft, 29 a sliding door provided for said doorway, 30 an additional sliding door provided for said doorway and cooperating with the door 29 for opening and closing said doorway, and 31 an elevator car of any suitable construction having a floor 32 to be brought into horizontal line with the several floors of the building, as is customary, so that passengers may, when the doors 29, 30 are opened, either leave the car and pass upon the flooring 27 or enter the car from said flooring. The elevator shaft 26, car 31 and doors 29, 30, except for the features of my invention, may be of any suitable or usual construction. The building will have as many floors 27 as may be necessary, and at each floor will be provided a doorway 28 and suitable elevator shaft-doors, which at present I indicate by the sliding doors 29, 30, it being understood that the invention is not limited to the employment of two doors 29, 30, since only one door may be made use of when desired, or the doors may be three or more in number. It is usual to employ a single sliding elevator shaft door or two of such doors or three doors, as occasion may render convenient.

Figure 1:
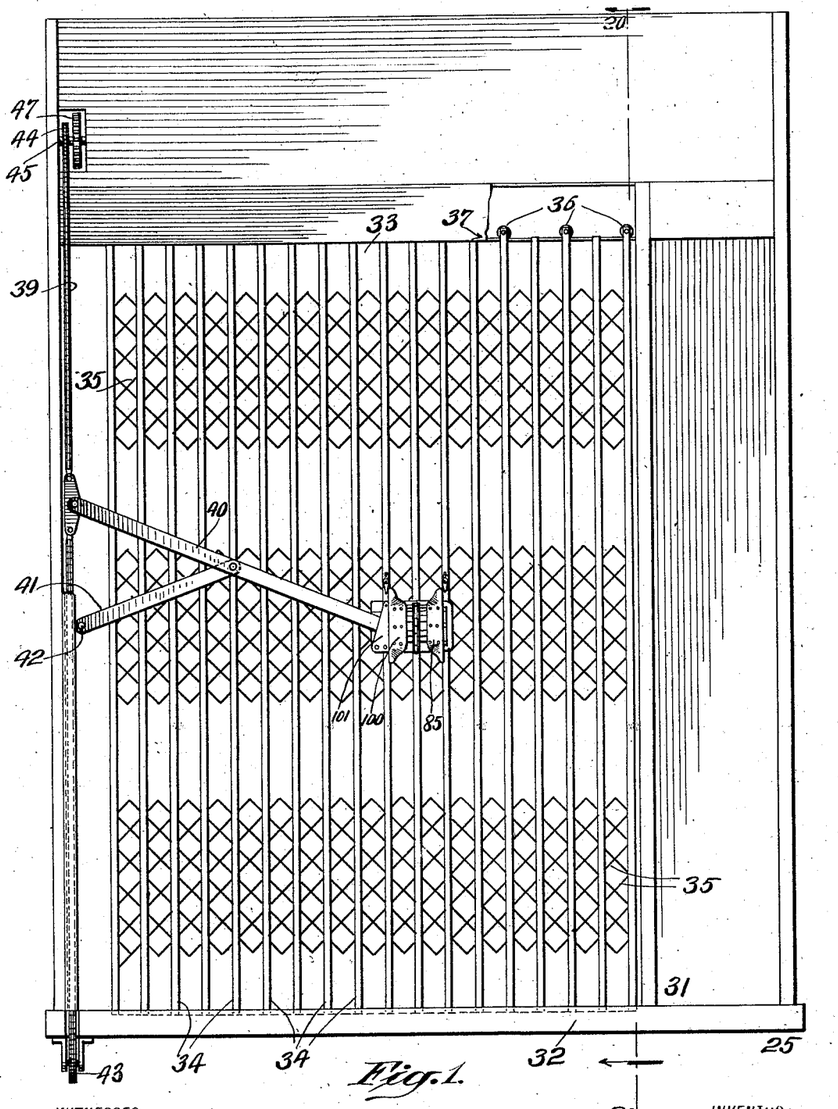
Fig. 1 is a front elevation, partly broken away, of an elevator-car, with the gate or door thereon shown in closed position.
Figure 19:
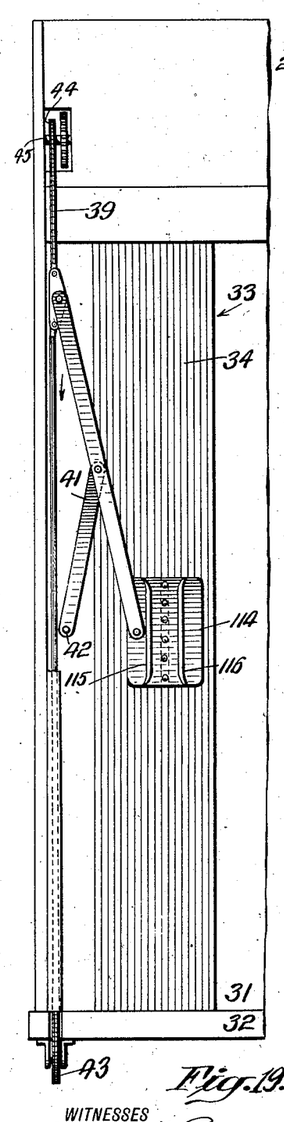
Fig. 19 is an elevation of the car gate and a portion of the car and showing the gate in its open position and with a modified construction of plate shown as carried by the gate for cooperation with the inwardly projecting arm carried by the shaft door.

The elevator car 31 is equipped with a gate 33 which, in the present instance, I form of vertical bars 34 connected by lazy-tong levers 35 adapted to permit of the collapsing of the bars 34 on the opening of the gate, as shown in Fig. 19, and the separating out of said bars when the gate is to be closed, as shown in Fig. 1, as usual. The alternate bars 34 are provided at their upper ends with small rollers 36 adapted to a tramway 37 located on the car above the doorway thereof and by means of which the gate becomes suspended and may be freely opened and closed in a well understood manner.

The features of my invention relate to means for opening and closing the car-gate 33 and to means for opening and closing the elevator-shaft doors 29, 30 from and by the operation of said gate, the means for operating the gate 33 being carried by the car and under the control of the attendant, and the means for opening and closing said doors being disposed at the shaft side thereof, where they are protected against manipulation by unauthorized persons who may be on the floors of the building.

Upon a suitable intermediate bar 34 of the gate 33 I secure, by rivets or otherwise, a plate 38 carrying the mechanism for actuating the shaft-door; and upon the car 31, preferably at one side thereof, I mount an endless operating chain or like flexible connection 39, and at the outer face of the gate 33 I connect the chain 39 with the actuating mechanism carried by the plate 38 by means of a lever-arm or bar 40, one end of said bar 40 being pivotally connected with the said mechanism on the plate 38 and the other end of said bar being likewise secured to the chain 39, and normally in the closed position of the gate 33 the bar 40 will incline downwardly and inwardly from said chain to said plate, as shown in Fig. 1. The bar 40 has pivoted to a middle portion thereof a link 41 which is pivotally secured to a stationary abutment on the car, as at 42, and normally in the closed position of the gate 33 said link inclines upwardly and inwardly from said abutment to said bar, as shown in Fig. 1.

The endless chain 39 is mounted on a lower sprocket-wheel 43 supported in bearings below the car floor and on an upper sprocket-wheel 44 secured on a shaft 45 which is supported in bearings in a suitable bracket or frame 46 (Fig. 21) carried at an upper portion of the car. The shaft 45 has secured upon it a gear-wheel 47 which is in mesh with a pinion 48 secured on a shaft 49 to be driven from a motor 50 which may be actuated from usual electric current conductors carried by the car. The motor 50 is equipped with a circular magnet-frame 51 adapted to be energized and create a magnetic field. Within the outline of the frame 51 and secured on the shaft 49 is a rotary magnetic actuator 52 whose rotation is effected from the motor 50 and frame 51 and which imparts its movement to the shaft 49 and pinion wheel 48, from which, as will be apparent, motion is transmitted through the gear-wheel 47, shaft 45 and sprocket-wheel 44 to the endless chain 39. The actuator 52 may be considered as a magnetic coupling, because it couples, through magnetic power, the shaft of the motor with the shaft, in this instance 49, to be actuated. The driving mechanism just briefly referred to is of very great advantage when employed in cooperation with the chain 39 and an elevator-car gate, as will be explained in detail hereinafter.

Figures 14, 15, 16, 17, 18:
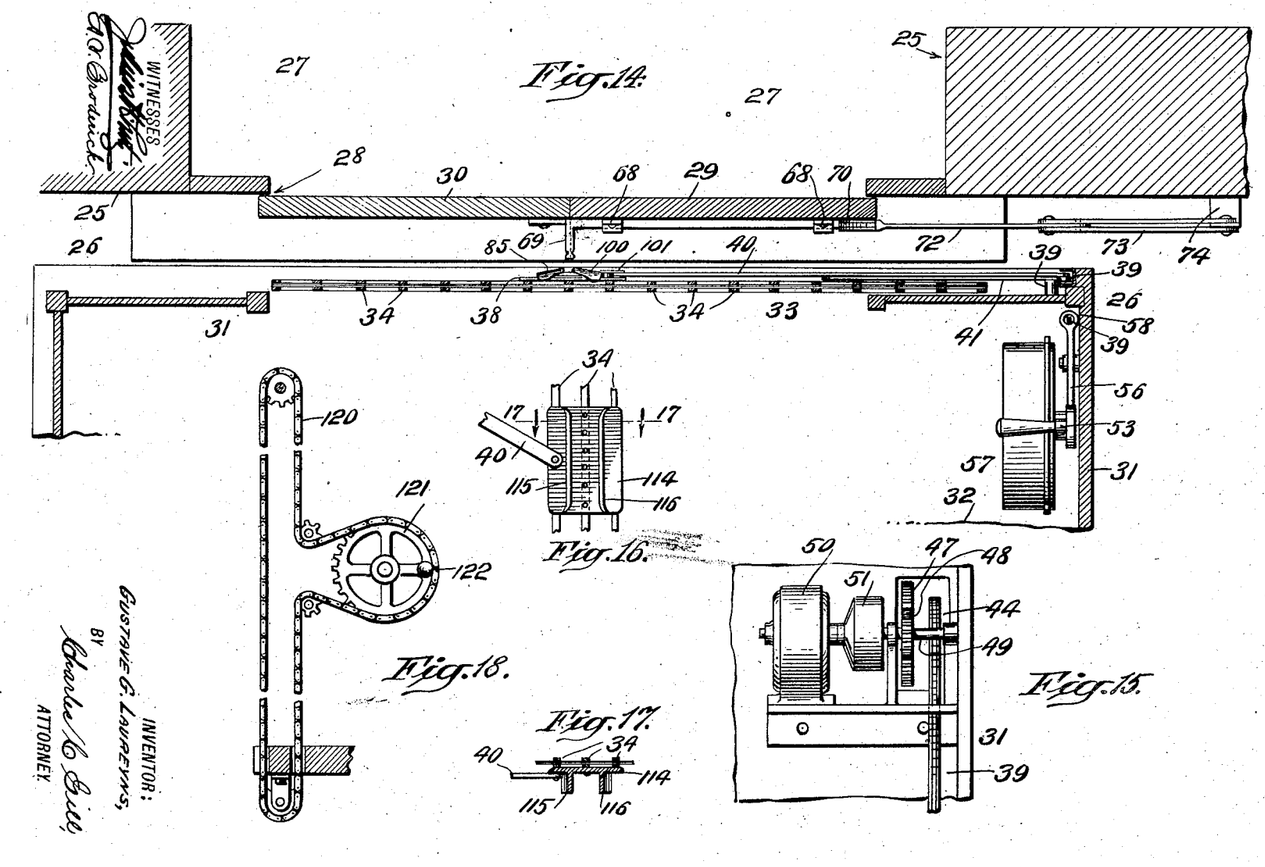
Figures 20, 21, 22:
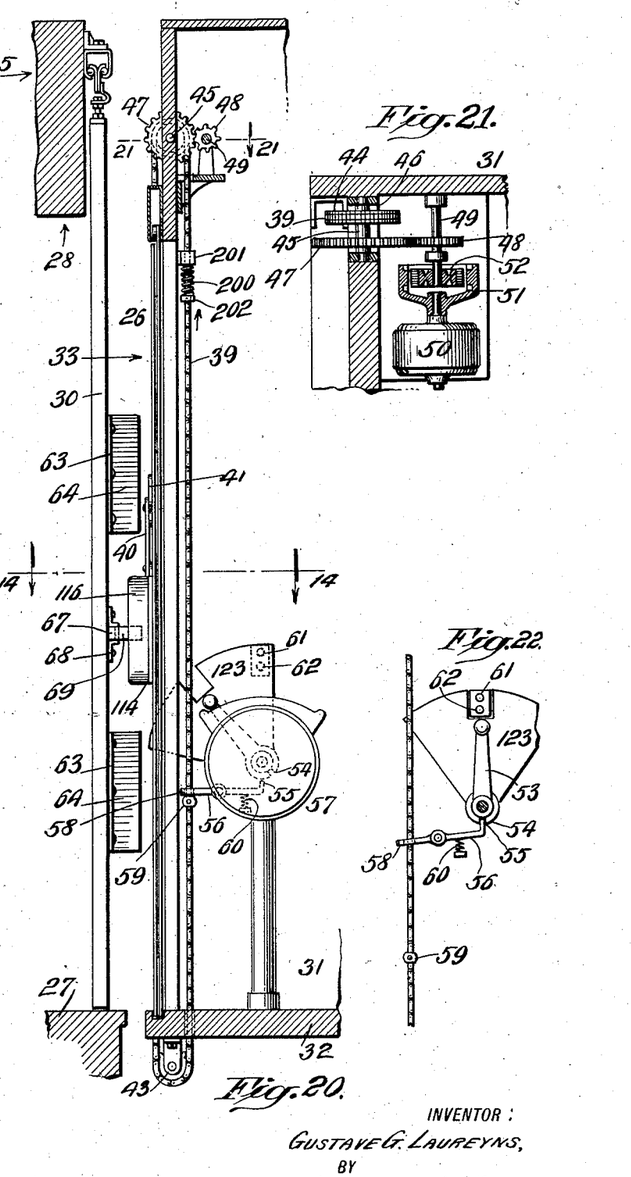
Fig. 20 is a vertical section through a portion of the elevator car, shaft and building at one of the floors of the building, taken on a line indicated by the dotted line 20—20 of Fig. 1, Fig. 20 illustrating the plate carried by the car gate, shown in Figs. 16, 17, and 19, and showing the car as having arrived opposite to the shaft doors and ready to be stopped preparatory to the opening of the car gate and through said gate the said doors.
Fig. 21 is a horizontal section through the upper portion of the car and adjacent parts, taken on the dotted line 21—21 of Fig. 20.
Fig. 22 is a detailed view illustrating the car control lever, a portion of the gate operating chain and a trip for locking the lever stationary in neutral position, with the power cut off from the car, said trip having been released to engage the control lever on a movement of said chain in a direction to open the car gate.

The car 31 will be equipped with the usual control mechanism to be operated by the attendant, an exception in this instance being that the control lever 53 is formed in its hub with a recess 54 to be engaged by a locking dog 55 secured on the end of a pivoted lever 56 carried with the control devices which, for convenience, I will number 57. The lever 56 is pivoted at about its middle portion, and at one end carries the dog 55, while at its other end said lever is formed with a loop or eye 58 through which the chain 39 travels, as shown in Figs. 14 and 20. Upon the chain 39, below the lever 56, is secured a stop 59 which normally in the closed position of the gate 33 engages the outer end of the lever 56, as shown in Fig. 20, and holds the dog 55 in an inoperative position, the dog-end of said lever 56 being then, however, pressed against in an upwardly direction by a spring 60. In Fig. 20 I illustrate the car as having arrived at a floor preparatory to being stopped thereat, and in stopping the car, at this time, the control-lever 53 will be moved into its vertical neutral position shown in Fig. 22, and thereupon the attendant will by means of a push-button or switch 61 or otherwise establish the circuit through the motor 50 and said motor acting through its connections will set the chain 39 in motion in a direction to open the gate 33, and the movement of the chain 39 under these circumstances will result in the stop 59 being carried downwardly from the lever 56 or to the position shown in Fig. 22, thereby retiring said stop from the lever 56 and permitting the spring 60 to turn the dog 55 upwardly into the recess 54 of the lever 53, whereby said lever will become locked in its neutral position with the power cut off from the car. When therefore the car is in motion, either ascending or descending, the stop 59 on the chain 39 maintains the lever arm 56 in inoperative position, but when the car has come to rest and the attendant energizes the motor 50, the stop 59 will leave the lever arm 56 and permit the dog 55 to enter the recess 54 and lock the lever 53 in its neutral position. When after the car 31 has come to rest and the gate 33 has been opened and it is desired to close said gate and re-start the car, the attendant will, by means of a push-button or switch 62, reverse the current through the motor 50 and thereby effect the movement of the chain 39 in a reverse direction or, in a direction to close the gate 33. The chain 39 on moving to close the gate 33 will carry the stop 59 against the lever-arm 56 and release the dog 55 from the control-lever 53, thereby leaving said lever free to be operated in one direction or the other according to whether it is desired that the car 31 shall ascend or descend, there being no movement of the chain 39 during the travel of the car except when it is desired that the gate 33 shall be either opened or closed.

When the chain 39 is operated to open the gate 33, said chain will draw upwardly on the outer end of the bar 40 and in doing so operate through the said bar and its connections on the plate 38 to pull the gate 33 to open position or that shown in Fig. 19, the link 41 at this time folding upwardly and outwardly. A reverse movement of the chain 39 will force the outer end of the bar 40 downwardly and the inner end of said bar then acting against the plate 38 will force the gate 33 to its closed position, shown in Fig. 1, the link 41 then turning downwardly and inwardly. The link 41 serves to control the movement of the bar 40 and during the closing of the gate 33 said link serves as a movable fulcrum for said bar.

The doors 29, 30 are in themselves of ordinary type and suspended by usual hangers, and the opening or closing movement of one door is communicated to the other through customary hanger mechanism. On the door 30 are secured angle plates 63 whose projecting flanges 64 are utilized by me in connection with the mechanism on the plate 38 secured on the elevator car gate and equipped with wings 65, 66, to prevent the car gate from opening the shaft doors except when the car is properly positioned with relation thereto. The flanges 64 constitute projections to be engaged by a wing 65 or other projection on the plate 38 whenever the gate 33 is started to open position when the car is not with reasonable accuracy at the floor of the building. When the elevator car is in correct position at rest at the floor of the building and the gate 33 is moved to open position, said plate 38 and wing 65 will pass between the projections 64 on the door 30 and perform the duty of unlocking the doors 29, 30, and opening said doors, but should the car be stopped when its floor is unduly above or below the building floor, the wing 65 will on the attempted opening of the gate 33, strike one or the other of the projecting flanges 64 and thereby said gate will become arrested and be unable to unlock and open the shaft doors.

The wings 65, 66 are parts of the mechanism carried by the plate 38 secured on the elevator car gate and are alternately turned outwardly as the gate is either opened or closed, as will be explained hereinafter.

On the door 29 I provide a slidable bar 67 which is mounted in loops 68 and has on its inner end an outstanding or right-angular arm or finger 69, while at its outer end said bar 67 is connected with one end of a chain 70 which is wrapped about a cam-shaped head 71 on the inner end of a toggle-arm 72 whose other end is pivotally connected with a pair of side-by-side toggle arms 73 pivotally mounted at their outer ends to a stationary abutment 74. When the doors 29, 30 are in closed position, the bar 67 and toggle levers 72, 73 will stand in the relation shown in Fig. 2, at which time the levers 72, 73 are on a dead center and lock the doors in closed position. When it is desired to open the doors 29, 30, said doors will be opened on and by the opening movement of the gate 33. When the elevator car comes to rest at a floor of the building and the gate 33 starts to open, the wings 65 on the gate will turn outwardly in line with the arm 69 on the bar 67, as I illustrate in Fig. 7, and then when the gate 33 continues its opening movement, said gate will carry the wing 65 on the plate 38 against the arm 69 of the bar 67 and force said bar to slide outwardly within the loops 68, and this will have the effect of pulling on the chain 70 and causing said chain, acting through the head 71 on the toggle lever 72 to turn said lever upwardly on its pivot, breaking the dead center between the levers 72, 73 and permitting the door 29 on its continued opening movement to fold said levers 72, 73 upwardly in the manner I illustrate in Fig. 3. The gate 33 therefore on its opening movement will, through the bar 67, unlock or free the toggle levers 72, 73 and push the door 29 to open position, the door 30 automatically following to its open position, due to the door-hanger mechanism. On the closing of the gate 33, the wing 65 will close inwardly and the wing 66 will turn outwardly in the plane of the arm 69 and move against said arm of the bar 67 and therethrough act to close the door 29, the door 30 automatically following to its closed position. On the closing of the door 29, the toggles 72, 73 will straighten out and at their joint pass into or slightly beyond a dead center relation so that they may serve as a lock for preventing the opening of the shaft doors from the outer or floor side thereof. I preferably form the inner end of the toggle lever 72 with a hook-like recess 75 to pass downwardly over a pin 76 on the toggle-levers 73 when the levers 72, 73 are returned to their horizontal position, said recess and pin serving to support the toggle-levers 72, 73 in their substantially horizontal position and also permitting the adjoining ends of said levers to pass into or slightly beyond a dead center relation.

The mechanism I provide for the shaft doors therefore comprises the projections 64 on the door 30 and the sliding bar 67 and toggle levers 72, 73 for the door 29, and these features are intended for cooperation with the gate 33 so that at the proper time the gate may be utilized for unlocking and opening and also for closing said doors.

The mechanism I apply to the outer face of the gate 33 comprises the aforesaid plate 38, wings 65, 66 and their accessories, all being more particularly shown in Figs. 4 to 13 inclusive. The plate 38 is a plain foundation plate riveted to a bar 34 of the gate, and on this plate 38 I mount an auxiliary plate 78 shown in detail in Fig. 10. The plate 78 is formed with loops 79, slots 80, a slot 81 and an outwardly turned lip 82, and guided on its horizontal sliding movements against the face of the plate 38 by the rivets 83, 84 which extend through said slots 80 and the plate 38 and also through an outer retaining bar 180 and the gate-bar 34 and aid in securing the plate 38 on the gate. The wing 65 may be a single plate, but is shown as made up of bars (Fig. 8), and it is hung in the loops 79 of the plate 78 so as to have a hinged movement. The outer face of the wing 65 may be covered by a shield 85, if desired, so as to avoid danger of the wing striking the edge of a flooring during the movement of the car, said shield preferably having inwardly deflected upper and lower ends. Ordinarily, however, the shield 85 may be omitted. The wing 65 is supported by the pintle 86 in the loops or knuckles 79 of the plate 78, and said wing is connected at its inner side by links 87 with stationary bars 88 fastened to the plate 38 and the gate 33 by means of the rivets 83, hereinbefore mentioned. The links 87 serve to control, on the sliding movement of the plate 78, the opening and closing movements of the wing 65; said wing 65 opening outwardly or to the position shown in Fig. 7 when the plate 78 is slid to the left looking at Figs. 7 and 8.

The wing 66 is similar to the wing 65, and its pintle 89 is mounted in loops 90 formed on the inner edge of a plate 91 which is mounted against the plate 78 and adapted to have a sliding movement against said plate 78. The plate 91 is shown in detail in Fig. 9, and it contains a guiding slot 92 and a lip 93. The slot 92 in the plate 91 is on the same horizontal plane with the slot 81 in the plate 78, and these two plates are connected with the inner lower end of the bar 40 by a follower 94 of the character shown in Fig. 13. The follower 94 has a central cylindrical hub portion 95 within a hole 96 in the end of the bar 40, and laterally extending horizontal elongated side lugs 97, 98, respectively, the lug 97 fitting within the slot 81 of the plate 78, and the lug 98 being entered within the slot 92 of the plate 91. During the opening and closing of the gate 33 and the movement of the bar 40, the follower 94 is adapted to have a movement along the slots 81, 92 and to move the plates 78, 91 for the purpose of causing the wings 65, 66 to alternately turn outwardly. The wing 66 is, correspondingly with the wing 65, connected by links 99 with the stationary bars 88, and said wing 66 will be opened outwardly to the position shown in Fig. 6 from the position shown in Fig. 5 by the movement of the lug 98 on the follower 94 against the right hand end of the slot 92 in the plate 91, the movement of said plate 91 toward the right, looking at Figs. 5 and 6, serving to turn the wing 66 outwardly, and the movement of said plate 91 in a reverse direction serving to close said wing 66 and its links 99 inwardly or to the position shown in Fig. 5. The wing 66 may also be equipped with a shield or guard-plate 100, corresponding with the guard-plate 85. Upon the left hand portion of the plate 38, looking at Figs. 4 and 8, is secured a retaining plate 101 by means of the rivets 102, which plate 101 serves as a housing to confine the lower end of the bar 40, follower 94, plate 91 and plates 78, 38 in position and proper relation to each other, without interfering with the movement of said bar and said plates 78, 91 during the opening and closing of the gate 33.

Figure 4:
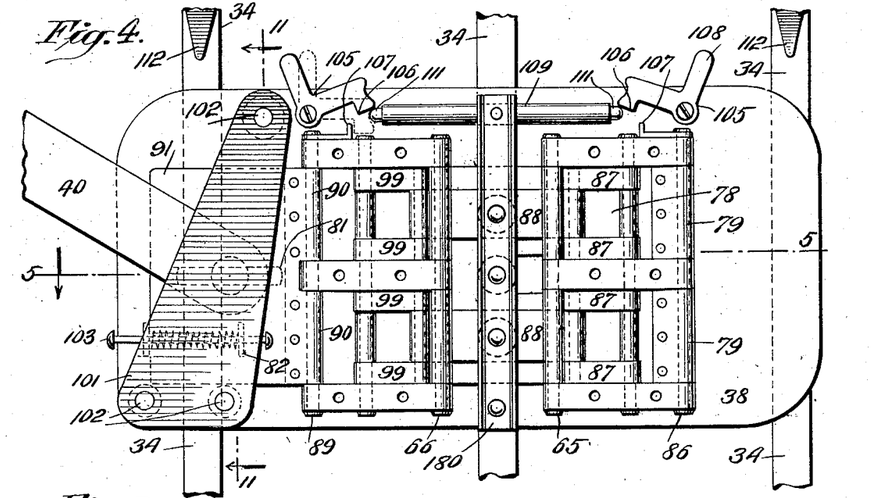
Fig. 4 is a front elevation, partly broken away, of the car gate in closed position and is presented to illustrate on a larger scale the mechanism applied to the vertical bars of said gate and shown on a reduced scale in the middle portion of Fig. 1.
Figure 5:
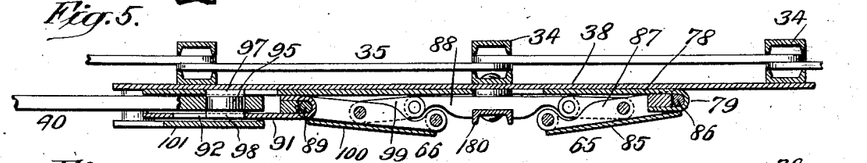
Fig. 5 is a horizontal section through the same, taken on the dotted line 5—5 of Fig. 4.
Figure 6:
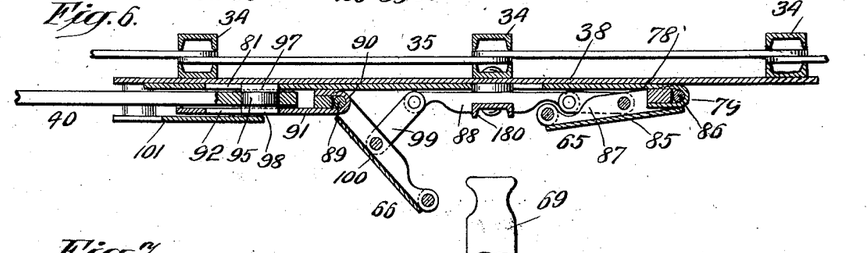
Figure 8:
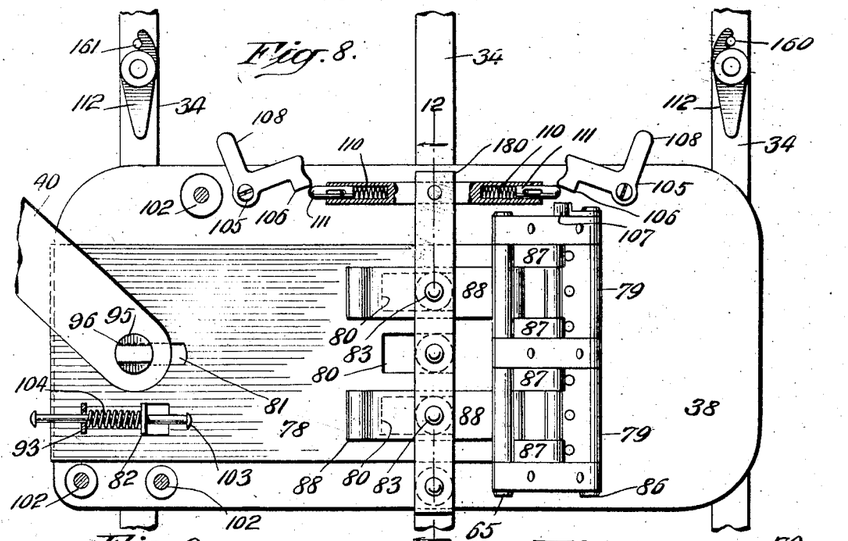
Figure 9:
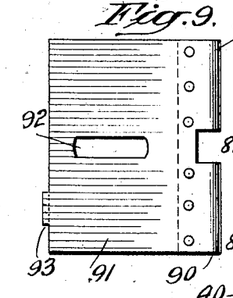
Fig. 9 is a detached front elevation of one of the plates carried by the car gate mechanism and shown in its operative position in Figs. 4 to 7 inclusive.
Figure 10:
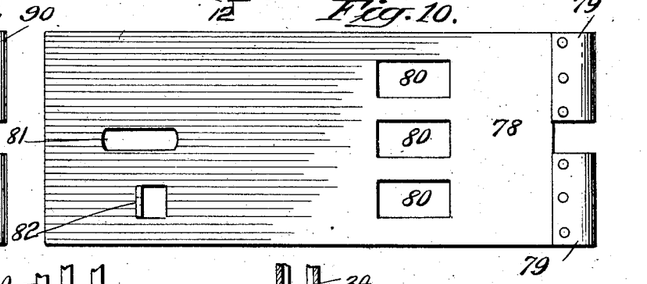
Fig. 10 is a corresponding view of another one of the plates forming a part of the car gate mechanism.
Figures 11, 12:
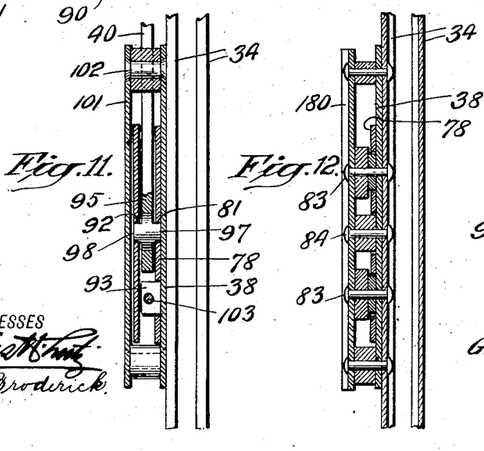
Fig. 11 is a vertical section through the car gate mechanism, taken on the dotted line 11—11 of Fig. 4.
Fig. 12 is a vertical section through the same, taken on the dotted line 12—12 of Fig. 8.
Figure 13:
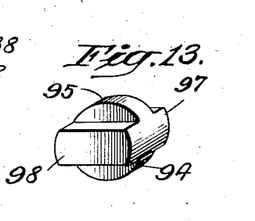
Fig. 13 is a detached perspective view of a follower carried by one of the car gate operating levers and engaged with and adapted to operate the mechanism carried by the car gate and shown in Figs. 4 to 12 inclusive.

Upon a pin 103 extending through the lip 82 on the plate 78 and the lip 93 on the plate 91, I confine a coiled spring 104, said spring exerting its expansive force against both of said lips and tending to force the plate 91 outwardly or toward the left, looking at Figs. 4 and 9, to aid in setting the right hand end of its slot 92 against the right hand end of the lug 98 of the follower 94 and also to aid in maintaining the wing 66 in its closed position, shown in Fig. 5. The pressure of the spring 104 against the lip 82 of the plate 78 tends to force said plate toward the right, looking at Fig. 8, so as to aid in maintaining the wing 65 in closed position and also to carry the left hand end of the slot 81 against the left hand end of the lug 97 of the follower 94.

Figure 7:
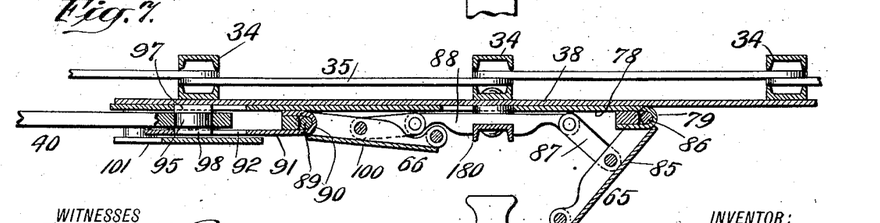
Fig. 7 is a corresponding section illustrating a different portion of the mechanism carried by the car gate as projected outwardly in position to engage the arm carried by the shaft door preparatory to the opening of said door with the opening of the car gate.

When the bar 40 is actuated to draw the gate 33 to its open position, the lug 97 being in engagement with the left hand end, looking at Figs. 4 and 8, of the slot 81 in the plate 78, will draw said plate 78 toward the left and thereby, through the links 87, turn the wing 65 outwardly to its operative position shown in Fig. 7 at one side of the arm 69 carried by the shaft door 29 and, in the present instance, forming a part of the slidable bar 67 mounted on said door. The continued movement of the gate-mechanism toward the left, during the opening of the gate 33, results in the wing 65 being carried against said arm 69 and in freeing the locking mechanism for the shaft doors 29, 30 and in the opening of said doors. During the movement toward the left of the plate 78, the lug 97 on the follower 94 presses against the left hand end of the slot 81, and at the same time the lug 98 on said follower travels along the slot 92 of the plate 91 and with said plate without causing said plate to open the wing 66. When the bar 40 is moved to close the gate 33, the lug 98 of the follower 94 acting against the right hand end of the slot 92 of the plate 91, will slide said plate toward the right and effect the opening of the wing 66 to the position shown in Fig. 6 at the left hand side, looking at Fig. 6, of the arm 69, and during the continued closing movement of the gate 33, the arm 40 acting through the follower 94, to effect said closing movement, will force the wing 66 against the arm 69 of the bar 67 of the shaft door locking mechanism and through the same effect the closing of the shaft doors 29, 30. During the closing movement of the gate 33 under the action of the bar 40 and follower 94, the plate 78 has a movement toward the right imparted to it, and that results in the closing of the wing 65, the closing of said wing being partly accomplished by the spring 104 during the travel of the follower 94 toward the right hand end of the slot 81 in the plate 78. The normal position of the wings 65, 66 is that shown in Fig. 5, and when the gate 33 is on its opening movement the wing 65 will be turned outwardly to engage the arm 69 and effect the opening of the shaft doors 29, 30, and when the gate 33 is on its closing movement, under the driving action of the bar 40, the wing 66 will be turned outwardly to engage the arm 69 and force the shaft doors to their closed position. During the final portion of the closing movement of the gate 33 by the bar 40, a coiled spring 200 interposed on the chain 39 (Fig. 20) between a rigid bracket 201 and a button 202 on said chain, will be compressed, and then when power is cut off from said chain by the attendant, said spring 200 will expand and cause the lower end of the bar 40 to recede slightly toward the left and carry the lug 98 on the follower 94 toward the left along the slot 92 and thereby relieve the plate 91 from the restraint of the bar 40 and the wing 66 from engagement with the arm 69, and at this moment the spring 104 will act to retract the plate 91 toward the left and effect the closing of the wing 66. At the initial closing movement of the gate 33, the spring 104 acts against the plate 78 to close the wing 65, and just after the closing of the gate 33, said spring 104 will act against the plate 91 to close the wing 66.

I provide means for latching the wings 65, 66 in closed position for use in case such means may be deemed necessary, and in Figs. 4 and 8 I illustrate for each wing a pivoted latch 105 adapted at its end 106 to engage an arm or finger 107 extending upwardly from and secured to the upper end of the wing. The latch 105 is pivoted on the plate 38 and has an upwardly extending arm 108, said latch being of right-angular general outline. Centrally of the upper part of the plate 38 is secured a barrel or tube 109 containing at each end a coiled spring 110 and latch-pin 111. When the latch 105 is turned downwardly to engage the finger 107 on the wing, 65 or 66, as the case may be, as indicated by the dotted lines at the left hand portion of Fig. 4, the point of the adjacent pin 111 will engage the recessed end of the latch and serve to lock the latch in its operative position to prevent the opening of the wing. The latches 105 will only be made use of on emergency occasions when it is desired that the wings 65, 66 may be locked in closed position during one operation either of the opening or closing of the car gate 33. There may be an occasion when it may be desired to open the car gate without opening the elevator shaft doors or to close the car gate without closing the elevator shaft doors, this latter condition arising, possibly, when it might be desired to move the car from a floor of the building downwardly for the purpose of placing something on top of the car or leaving the shaft door open so that a repairman, for instance, might step upon the top of the car. After the car has been used with the wings 65, 66 latched in closed position, the next operation of the car gate should release the latches from the wings 65, 66, and to this end I provide on the gate bars 34 at opposite sides of the gate bar 34 carrying the plate 38, pivoted dogs 112 adapted to ride over the arms 108 of the latches 105 when the car gate is moving in one direction and operate against said arms 108 to turn said latches into inoperative position when the car gate is moved in a reverse direction. It may be considered, looking at Figs. 4 and 8, that both of the latches 105 are in their operative position indicated by the dotted lines at the left hand end of Fig. 4, and when the car gate 33 is opened, it will be seen that the right hand dog 112, looking at Fig. 8, will ride over the arm 108 of the right hand latch 105 without disturbing said latch, and also that the left hand dog 112 on reaching the arm 108 of the left hand latch 105 will freely ride over said arm, since at this time said left hand dog 112 will, on the closing or collapsing of the gate 33, move in a direction toward the said left hand latch 105. When the gate is again closed, having opened freely without operating the wings 65, 66, the movement of the right hand dog 112, looking at Fig. 8, outwardly toward the right, will carry said dog against the left hand edge of the arm 108 of the right hand latch 105 and by pressing against the same turn said latch upwardly from the wing 65, said dog 112 then being prevented from swiveling or riding over the top of said arm 108 because of the presence of the stop pin 160 against which the upper end of the dog presses. During this same closing movement of the gate the left hand dog 112 on moving toward the left will tilt upwardly the left hand latch 105 to free the wing 66, said dog 112 then being prevented from riding over said latch by reason of the engagement of its upper end with the stop pin 161. Thus the car gate may be opened when the latches 105 are in operative position without the wings 65, 66 being opened, but on the closing of the gate the latches 105 will be restored to their inoperative position by the engagement therewith of the dogs 112. Usually the latches 105 will not be placed in operative position, but it is necessary that they be provided because of the occasional periods when it may be desired to operate the car gate without regard to the elevator shaft doors.

I make use of the hinged wings 65, 66, with the mechanism for operating them, in instances in which the space between the car 31 and the elevator shaft at the floors 27, is so greatly restricted that it becomes necessary not to have permanent projections of any great length extend from the car outwardly toward that side of the shaft at which the shaft doors are located. The wings 65, 66 are simply foldable arms, and they are made foldable so that they may normally occupy the minimum amount of space between the car and the adjacent portions of the shaft. When the car has come to rest at a floor of the building, there is abundant space for the operative position of the wings 65, 66, and hence at that time said wings may be turned outwardly, but during the travel of the car in a restricted shaft, the wings 65, 66 must remain folded inwardly in near relation to the gate 33.

I prefer when the conditions in the elevator shaft permit, not to employ the foldable wings or arms 65, 66, but to make use of a rigid plate 114 such as I show in Figs. 16, 19 and 20, this plate being secured to one of the bars 34 of the gate 33 and employed in lieu of the plate 38 and its accessory parts shown in Fig. 4. The plate 114 has two parallel vertical arms, flanges or wings 115 and 116, which are utilized as means for acting against the arm 69 of the shaft door operating mechanism. When the car comes to rest at a floor of the building, as shown in Fig. 20, the arm 69 will stand between the arms or wings 115, 116, of the plate 114, and on the movement of the gate 33 to its open position, the arm 116 will, by moving against the arm 69, force the shaft-doors to open position. On the closing movement of the gate 33, the arm 115 will engage the arm 69 of the shaft door mechanism and effect the closing of the shaft doors with the closing of the car gate 33. In the elevator shaft construction indicated in Fig. 20, there is abundant room for the employment of the stationary arms or wings 115, 116.

The plates or projections 64 provided on the door 30 may or may not be made use of, as may be desired. If an attempt is made to open the gate 33 when the car is not reasonably at a floor of the building, the wings, either of the type shown in Fig. 4 or that shown in Fig. 16, will strike one or the other of the said plates 64 and prevent the opening of the shaft doors until the attendant has restored power to the car and moves it to a proper position with relation to the floor 27. When the car has arrived at a proper position and it is desired to open the gate 33 and shaft doors 29, 30, the aforesaid wing 65, 66 or 115, 116 may slide horizontally between the plates 64 and perform their duty with respect to the arm 69 of the shaft door mechanism.

Figure 2:
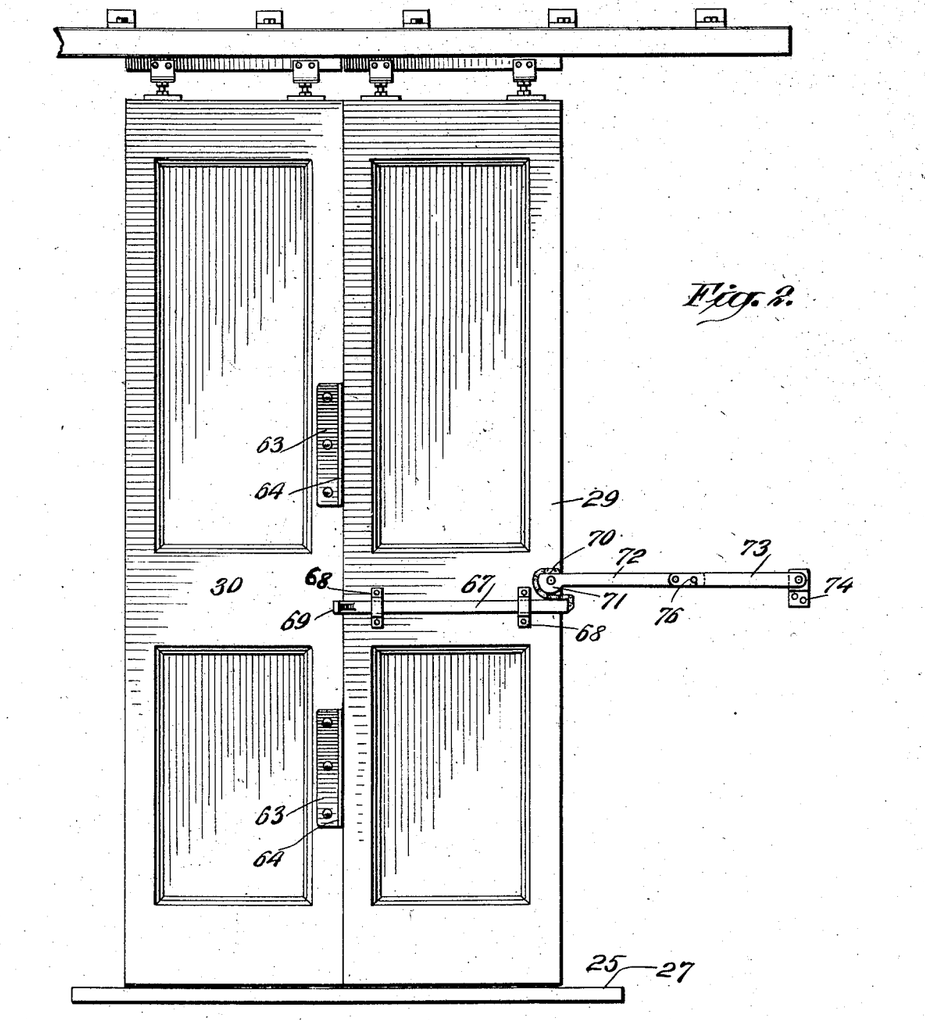
Fig. 2 is a rear or back elevation of a pair of sliding shaft-doors of a character employed at the various floors of a building to close and open the elevator shaft doorways thereat, said doors being shown as locked in closed position and arranged for cooperation with the car-gate shown in Fig. 1.
Figure 3:
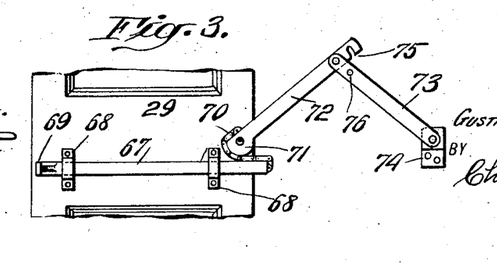
Fig. 3 is an elevation of a portion of the same showing the door-locking mechanism in its tripped condition releasing the shaft doors.

The mechanism I apply to the doors 29, 30 is that shown in Figs. 2 and 3, and the mechanism I provide for the elevator car comprises the gate 33, the mechanism mounted on the plate 38 secured to said gate, the chain 39, bar 40 and link 41, together with means for operating said chain for opening and closing said gate and also means for locking the control-lever 53 in its neutral position when the car has come to rest at a floor of a building and said gate is to be opened and effect the opening of the shaft doors. I also provide on the car, in the preferred embodiment of my invention, the motor 50 and magnetic coupling members 51, 52 cooperating with the means connected with the shaft 49 for operating the chain 39 to open or close the gate 33, a convenient button or switch 61 being provided on the car for starting the motor in motion in one direction and a convenient button or switch 62 being provided on the car for effecting the reversal of motion in said motor. The motor 50 may be driven from the lighting circuit at present in use on elevator cars or from any other suitable source of current, and since the wiring from push-buttons or switches, such as those numbered 61, 62 for setting a motor in action, is of common-place character, I do not illustrate such wiring in the drawings, it being probable that the wiring will vary with the varying conditions of cars to which my invention may be applied.

I greatly prefer the employment of the motor 50 and actuator or coupling member 52 as means for actuating the chain 39, but I do not wish to limit every feature of my invention to the employment of said motor and actuator, and hence I illustrate in Fig. 18 a modification of a portion of the invention in which I number the gate operating chain 120 and provide for its manual operation by means of a sprocket wheel 121 and crank handle 122. With the mechanism shown in Fig. 18 the attendant on the car may operate the chain manually. I prefer, however, for passenger cars more particularly, to make use of the motor 50 and actuator 52. I may say, however, that the special gear connections between the shaft 49 and the shaft for the sprocket wheel 44, may vary and that my invention is not, therefore, confined to any special transmitting mechanism between the actuator shaft 49 and the sprocket wheel shaft 45.

In carrying out my invention I will conceal as far as possible the lever 56 behind a hood or casing of any known character, such casing being old for covering-over gear wheels and the like and therefore not necessary to be shown in the drawings, and that I will also preferably have a shield 123 connected with the control lever 53 which will conceal the switch buttons 61, 62, except at such time as the control lever 53 is standing in its neutral position shown in Fig. 22, this being a precautionary measure which will prevent anyone from pressing on the switches 61, 62, except when the car has been brought to rest. The details of means for concealing the switch buttons 61, 62, except in the neutral position of the lever 53, are unimportant to my invention, but may consist of a fan-shaped plate, as shown, having a recess cut therein to stand opposite to said switches 61, 62 when the control lever 53 is in its neutral position shown in Fig. 22, said plate concealing said switches 61, 62 in all the other positions of the lever 53, as may be understood on reference to Fig. 20.

The operation of all of the features of the mechanism of this invention has been sufficiently described hereinbefore with the exception of that relating to the motor 50 and parts intermediate the same and the driving chain 39. The motor 50 may be driven first in one direction of motion and then in the other, and when rotated effects the corresponding rotation of the frame or field magnet 51, which is circular in outline and within which is located the armature or actuator 52, the latter being secured on the transmission shaft 49. It may be observed on reference to Fig. 21 that a space is left between the rotary actuator 52 and the frame 51. The actuator 52 is in the form of a disk provided on its periphery with electro-magnets and constitutes an armature rotating within the outline of the field magnet 51. When the motor 50 is in motion, the field magnet 51 rotates and its energy is communicated to the armature 52 which is set in motion and actuates the transmission shaft 49 whose motion is communicated to the driving chain 39. The field magnet 51 and armature 52 may be regarded as a magnetic coupling, and one of the great benefits to be derived from the employment of this coupling in an elevator car gate mechanism is that should the gate become arrested by striking a passenger or other obstruction, there will be a slippage between the field magnet 51 and armature 52 with the result that the passenger will not be injured and the mechanism connected with the gate will not be broken, as would likely be the case if the gate were driven by mechanical means of an unyielding nature. It will be understood therefore without extended comment that, especially for passenger elevators, a magnetic coupling is one of very great importance, and I believe I am the first person to adapt a mechanism of this nature for use on passenger cars or in any equivalent situation. The parts of the magnetic coupling are capable of variation in respect to their construction and relation to each other, as will be understood without detailed explanation.

I may add that when the proper button is pressed to open the gate, all safety features will operate automatically and the lever 56 will act an interval of time before the gates and doors do actually commence to yield. When the proper button has been pressed to close the gate, the lever 56 will not release until the car gate and shaft door are actually closed and in their locked position.

It will also be clear that the motive power and gearing being proportioned to operate at a preadjusted ratio of speed, the travel of the door and gate constitute a steady "load," and even in case of non-slip of the actuator, the work to be performed is limited. Thus the door and gate will not accelerate from momentum, and no slamming (usually resulting from momentum and acceleration) of the door and gate will take place.

My invention admits of modification and rearrangement in many of the details hereinbefore described as illustrative of a preferred embodiment of the invention. I may add that while I refer to the gate on the car as a gate, the same may in many instances be in the form of a sliding door instead of in the folding-bar gate construction illustrated, without departure from my invention. I may mention also that the projections 64 will in many instances be applied on the door 29 instead of on the door 30.

The invention presents many advantages in operation, in ensuring safety and in other respects which will be understood without extended explanation. The purposes of my invention are accomplished by a single co-acting easily installed equipment, and one advantage of the invention is that it enables the operator on a car to devote more attention to the safety and welfare of the passengers, being conscious that the mechanical parts will act automatically, safely, in due turn, and with precision.

What I claim as my invention and desire to secure by Letters-Patent, is—

1. In mechanism of the character described comprising an elevator car having a gate, an elevator shaft, and shaft-doors at the floors of the building, locking devices at the shaft side of said doors for locking them closed, means on said gate for engaging said devices when said gate is opened and releasing them and moving said doors, respectively, to open position and holding them open, and means on the car independent of the car control mechanism for opening and closing said gate and therethrough the shaft doors, said door locking mechanism comprising a slidable bar having a projection to be engaged by said means on the gate, pivoted toggle levers adapted to pass into a dead center relation for locking the door closed, one of said levers having a head on its end adjacent to said bar, and a chain connecting said head and bar and extending around said head, whereby on the movement of said bar in one direction it will act through said chain and head to move said levers to releasing position.

2. In mechanism of the character described comprising an elevator car having a gate, an elevator shaft, and shaft-doors at the floors of the building, locking devices at the shaft side of said doors for locking them closed, means on said gate for engaging said devices when said gate is opened and releasing them and moving said doors, respectively, to open position and holding them open, and means on the car independent of the car control mechanism for opening and closing said gate and therethrough the shaft doors, the means on said gate for engaging the said locking devices comprising a hinged wing adapted to be closed against said gate when not in use and means operable from the gate opening mechanism for projecting said wing into the path of said locking devices for engaging and operating the same when said gate is on its opening movement.

3. In mechanism of the character described comprising an elevator car having a gate, an elevator shaft, and shaft-doors at the floors of the building, locking devices at the shaft side of said doors for locking them closed, means on said gate for engaging said devices when said gate is opened and releasing them and moving said doors, respectively, to open position and holding them open, and means on the car independent of the car control mechanism for opening and closing said gate and therethrough the shaft doors, the means on said gate for engaging the said locking devices comprising hinged wings adapted to be closed against said gate when not in use and means operable from the gate operating mechanism for alternately projecting said wings into the path of said locking devices for engaging the same on the respective opening and closing movement of said gate.

4. In mechanism of the character described comprising an elevator car having a gate, an elevator shaft, and shaft-doors at the floors of the building, locking devices at the shaft side of said doors for locking them closed, means on said gate for engaging said devices when said gate is opened and releasing them and moving said doors, respectively, to open position and holding them open, and means on the car independent of the car control mechanism for opening and closing said gate and therethrough the shaft doors, the means on said gate for engaging said locking devices comprising wings hinged to fixed abutments, sliding plates on said gate, links connecting said plates and wings and adapted to move said wings to open position as said plates are respectively moved on the opening and closing movements of said gate and means operable from the gate operating mechanism for alternately sliding said plates.

5. In mechanism of the character described comprising an elevator car having a gate, an elevator shaft, and shaft-doors at the floors of the building, locking devices at the shaft side of said doors for locking them closed, means on said gate for engaging said devices when said gate is opened and releasing them and moving said doors, respectively, to open position and holding them open, and means on the car independent of the car control mechanism for opening and closing said gate and therethrough the shaft doors, the means on said gate for engaging said locking devices comprising wings hinged to fixed abutments, sliding plates on said gate, links connecting said plates and wings and adapted to move said wings to open position as said plates are respectively moved on the opening and closing movements of said gate, means operable from the gate operating mechanism for alternately sliding said plates to open their respective wings, and a spring for closing said wings after they have performed their duty.

6. In mechanism of the character described comprising an elevator car having a gate, an elevator shaft, and shaft-doors at the floors of the building, locking devices at the shaft side of said doors for locking them closed, means on said gate for engaging said devices when said gate is opened and releasing them and moving said doors, respectively, to open position and holding them open, and means on the car independent of the car control mechanism for opening and closing said gate and therethrough the shaft doors, the means on said gate for engaging said locking devices comprising wings hinged to fixed abutments, sliding plates on said gate, links connecting said plates and wings and adapted to move said wings to open position as said plates are respectively moved on the opening and closing movements of said gate and means operable from the gate operating mechanism for alternately sliding said plates, and comprising a bar connected with said gate operating mechanism and a follower having a hub mounted in said bar and opposite side lugs mounted in elongated slots formed in said plates and normally offset from each other.

7. In mechanism of the character described comprising an elevator car having a gate, an elevator shaft, and shaft-doors at the floors of the building, locking devices at the shaft side of said doors for locking them closed, means on said gate for engaging said devices when said gate is opened and releasing them and moving said doors, respectively, to open position and holding them open, means on the car independent of the car control mechanism for opening and closing said gate and therethrough the shaft doors and automatically releasable means carried by the gate for rendering said engaging means carried thereby inoperative during a movement of the gate.

8. In mechanism of the character described comprising an elevator car having a gate, an elevator shaft, and shaft-doors at the floors of the building, locking devices at the shaft side of said doors for locking them closed, means on said gate for engaging said devices when said gate is opened and releasing them and moving said doors, respectively, to open position and holding them open, and means on the car independent of the car control mechanism for opening and closing said gate and therethrough the shaft doors, the means on said gate for engaging the said locking devices comprising hinged wings adapted to be closed against said gate when not in use and means operable from the gate operating mechanism for alternately projecting said wings into the path of said locking devices for engaging the same on the respective opening and closing movement of said gate, combined with automatically releasable means carried by the gate for latching said wings in inoperative position during a movement of the gate.

9. In mechanism of the character described comprising an elevator car having a gate, an elevator shaft, and shaft-doors at the floors of the building, locking devices at the shaft side of said doors for locking them closed, means on said gate for engaging said devices when said gate is opened and releasing them and moving said doors, respectively, to open position and holding them open, and means on the car independent of the car control mechanism for opening and closing said gate and therethrough the shaft doors, the means on said gate for engaging the said locking devices comprising hinged wings adapted to be closed against said gate when not in use and means operable from the gate operating mechanism for alternately projecting said wings into the path of said locking devices for engaging the same on the respective opening and closing movement of said gate, combined with manually operative spring-latches carried by the gate, which is a collapsible bar gate, for locking said wings in inoperative position, and pivoted dogs on the bars of the gate adapted to yield in one direction and ride over said latches on a movement of the gate and on the next movement of the gate to trip said latches and free said wings.

10. In mechanism of the character described, an elevator car having a collapsible bar gate, and means on the car for operating said gate comprising an endless vertically arranged chain, a bar pivoted at one end to said chain and at its other end to an intermediate bar of said gate, and a link pivoted at one end to a fixed abutment and at its other end to an intermediate part of said bar and serving as a stay and movable fulcrum for said bar.

11. In mechanism of the character described comprising an elevator car having a collapsible bar gate and a manually operative power-control lever, means for operating said gate comprising an endless chain and a movable bar connecting the chain with an intermediate bar of the gate, and means for locking said control lever in neutral position while said gate is in open position comprising a pivoted spring latch normally free of said chain and a shoulder on said chain normally engaged with said latch in the closed position of said gate and movable with said chain from said latch on the opening movement of said gate and thus freeing said latch to engage and lock said lever, said shoulder on the closing movement of said gate and chain being carried against said latch to free the same from said lever.

12. In mechanism of the character described, an elevator car having a gate to be opened and closed, and means for operating said gate comprising means connected therewith for transmitting motion thereto, a reversible electric motor and means intermediate said motor and said motion transmitting means comprising a field magnet rotatable from said motor and an armature rotatable in the field of said magnet and connected with said transmitting means for actuating the same, said magnet and said armature constituting a magnetic coupling and being at all times spaced from and therefore free of physical engagement with each other.

13. In mechanism of the character described, an elevator car having a gate to be opened and closed, a power-control lever, means independent of said control lever for operating said gate comprising means connected with said gate for transmitting motion thereto, a reversible electric motor and means intermediate said motor and said motion transmitting means comprising a field magnet rotatable from said motor and an armature rotatable in the field of said magnet and deriving motion therefrom and connected with said transmitting means for actuating the same, said magnet and said armature constituting a magnetic coupling and being at all times spaced from and therefore free of physical engagement with each other, and means for preventing the setting in motion of said motor except when said control lever is in neutral position.

14. In mechanism of the character described, an elevator car having a gate to be opened and closed, an endless chain connected with said gate for operating the same, and means under the control of the attendant on the car for actuating said chain comprising a reversible electric motor and means intermediate said motor and said chain comprising a field magnet rotatable from said motor, an armature rotatable in the field of said magnet and deriving motion therefrom, and gearing leading from the shaft of said armature to said chain for transmitting motion thereto, said magnet and said armature constituting a magnetic coupling and being at all times spaced from and therefore free of physical engagement with each other.

Signed at New York city, in the county of New York and State of New York, this 6th day of November, A. D. 1920.

GUSTAVE G. LAUREYNS.